Dec. 26, 1939.  H. A. HUSTED  2,184,800
STEERING WHEEL RIM AND SPOKE CONSTRUCTION
Filed June 15, 1937  2 Sheets-Sheet 1

INVENTOR.
HARRY A. HUSTED
BY
ATTORNEY.

Dec. 26, 1939.   H. A. HUSTED   2,184,800
STEERING WHEEL RIM AND SPOKE CONSTRUCTION
Filed June 15, 1937   2 Sheets-Sheet 2

INVENTOR.
HARRY A. HUSTED
BY
John H. Brouard
his ATTORNEY.

Patented Dec. 26, 1939

2,184,800

UNITED STATES PATENT OFFICE 2,184,800

STEERING WHEEL RIM AND SPOKE CONSTRUCTION

Harry A. Husted, St. Clair, Mich., assignor, by mesne assignments, to The Standard Products Company, Port Clinton, Ohio, a corporation of Ohio Application June 15, 1937, Serial No. 148,296

4 Claims. (Cl. 29—159)

This invention relates generally to an improvement in the manufacture of automobile steering wheel spiders and is more specifically directed to a method and means for anchoring each of a plurality of wire spoke members to a rim annulus so that a thin coating of thermally moldable material can be applied to the spider which will completely cover the rim annulus and anchor elements and present a smooth uniform external surface contour and also to a method for securing a transverse ornamental tie bar member which bridges each group of wire spoke members to its associated group.

In the manufacture of steering wheel spiders of the present design it has been extremely difficult to provide an efficient and inexpensive anchor for securing each of the several wire spoke members rigidly to the rim annulus. This difficulty has been further increased by the present demand for steering wheels which are covered with a cellulose acetate thermoplastic coating. The relatively high cost of this cellulose acetate coating necessitates the application of a minimum quantity of the material to each wheel. Accordingly the steering wheel spider is enveloped in a relatively thin uniform coating of this material which covers the entire rim and spoke anchors and in some instances the spokes.

Prior anchoring devices require that each of the spoke members be provided with a head or other similar abutment which is interposed between the anchor plate and the surface of the rim, the anchor plate in turn being provided with openings through which the spoke members pass. Such a device is shown in application, Ser. No. 52,158, filed November 29, 1935, of Harry A. Husted.

The anchor disclosed in said application provides a rigid means for securing the spoke members to the rim but is considerably more expensive to manufacture because of the additional operation of providing a head on each of the spokes. Furthermore, in such a construction the position of each head must necessarily be accurately positioned so as to lie in an arc adjacent the inner periphery of the rim. Therefore, it requires considerable expense by reason of the amount of time and skill required to so position and hold these spokes while they are being cast or otherwise secured into the hub member. Also there is inherently some variation in the dimension and shape of each rim. This variation, even though very slight, affects the efficiency of such a method of anchoring since the spokes depend for their rigidity upon the physical abutment of the head against both the rim and the anchor plate.

One of the objects, therefore, of the present invention lies in the provision of an effective and inexpensive anchor for attaching the spoke members and more particularly wire spoke members rigidly to the rim member.

Another object is to provide such an anchor which will permit a reasonable variation or tolerance between the spoke members and the rim without affecting the efficiency of the anchor.

Still another object is to provide a quicker and less expensive method of assembling the spoke members to the rim.

A further object is to provide a method and means for securing the spokes to the rim which eliminates certain preparatory operations heretofore necessary.

A still further object is to provide an anchor embodying the above improvements which can be readily covered by the same thin coating of cellulose acetate material which covers the rim without affecting or changing the outer surface contour of the finished rim.

Another and further object is to provide an improved method of firmly securing the transverse ornamental tie bar to a group of wire spoke members which saves considerable time and expense in assembling the steering wheels.

Other objects and advantages of the invention will become apparent from the consideration of the specification taken in conjunction with the accompanying drawings.

For the purpose of illustration the present anchor will be specifically directed to steering wheels having spokes which comprise a plurality of wire spoke members because the problems encountered in the manufacture of such wheels are more difficult than the usual tubular or solid bar spoke. However, a similar type of anchor can readily be employed to secure a single tubular or solid bar spoke member to the rim.

Figure 1:
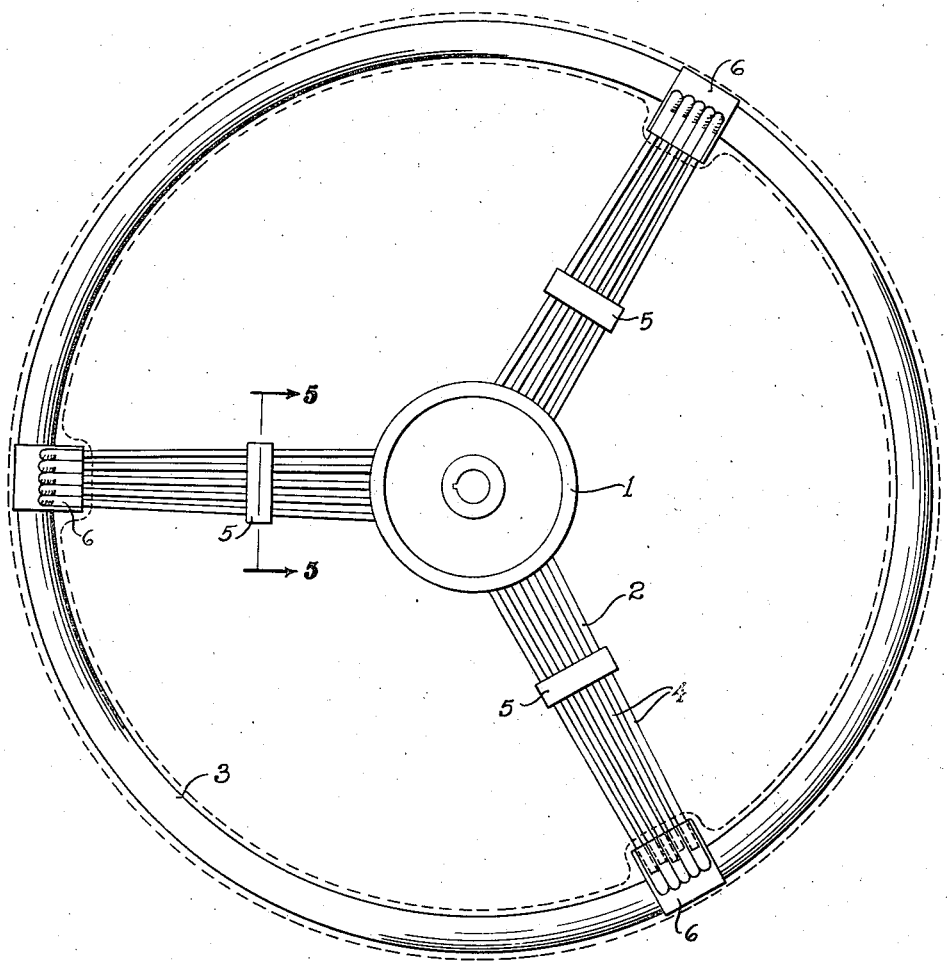
Fig. 1 is a plan view of the steering wheel embodying the present invention.

Referring to the drawings the steering wheel spider, as shown in Fig. 1, comprises in general a hub member 1, spokes 2 and a rim member 3, all of which are joined together in a rigid composite structure.

Figure 2:
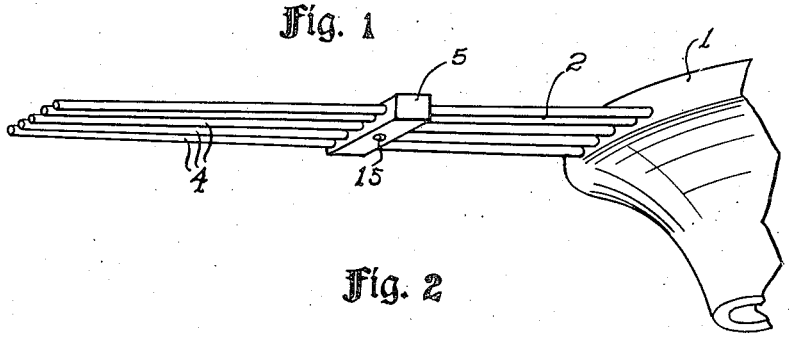
Fig. 2 is a fragmentary perspective view of a portion of the hub and one of the spokes which comprises a group of wire spoke members with the ornamental tie bar attached thereto.

Each of the spokes 2 includes a plurality of metal wire spoke members 4 arranged in groups as shown in Figs. 1 to 4, inclusive. The hub 1 is preferably a cast or forged member and, as shown in Fig. 2, is generally bell-shaped on the outer surface. One end of each of the wire spoke members is embedded in the hub as by casting or otherwise firmly attaching thereto. The wire spoke members extend from the surface of the hub in a substantially radial direction and terminate in free end portions as shown in Fig. 2.

Secured to each group of wire spoke members is a transverse ornamental tie bar 5 which preferably lies substantially mid-way between the hub 1 and the free end portions of the spoke members. The particular novel method for securing this tie bar in position will be hereinafter fully described.

The rim 3 may be made of solid metal, as shown, or of tubular material, preferably circular in cross section and shaped in the form of a continuous ring, as shown in Fig. 1. The inner periphery of the ring is slightly greater in diameter than the circle defined by the free end portions of the wire spoke members so that the spokes can be readily attached to the rim.

Figure 3:
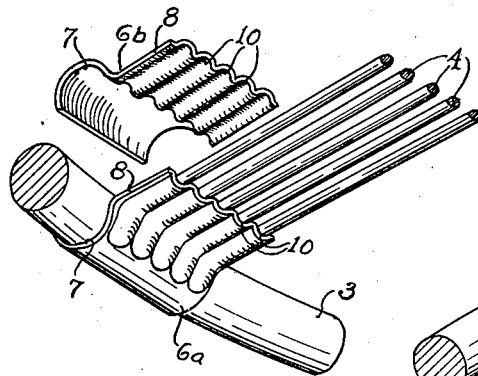
Fig. 3 is a fragmentary perspective view of the anchor from the lower side showing the first step of assembling.
Figure 4:
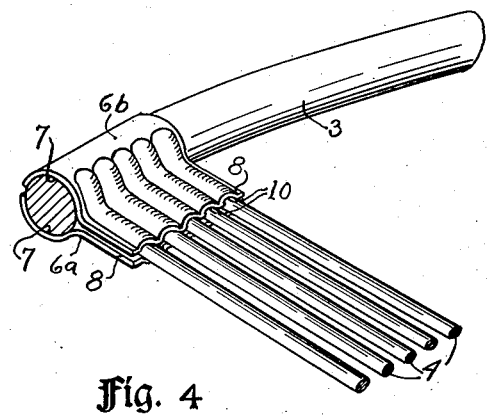
Fig. 4 is a fragmentary perspective view from the top showing the spokes in anchored position on the rim.

Each of the spokes 2 is secured to the rim through the medium of an anchor 6, as best shown in Fig. 4. This anchor comprises a pair of duplicate elements which for purposes of convenience in description will be designated 6a and 6b. These elements are preferably stamped or otherwise formed from a relatively thin piece of sheet metal so that when the element is mounted on the rim, for example, the cross-sectional dimension of the rim at the anchor element is only slightly greater than the cross-sectional dimension of the rim alone. Each element 6a or 6b includes a semi-cylindrical or claw-shaped portion 7 and a shank portion 8. The claw-shaped portion 7 is so shaped as to embrace substantially half of the cross section of the rim 3, as indicated in Fig. 3. The shank portion 8 of each element 6a or 6b extends in the direction along the associated spoke members 4 and is provided with corrugations or a plurality of troughs 10 in one face which correspond in number to the number of spoke members 4 in each spoke 2. These troughs are formed to receive and partially embrace the free end portions of each of the wire spoke members 4.

The method followed in securing the spokes to the wheel rim comprises essentially placing and holding the spokes and rim in the desired relative position, placing duplicate anchor elements on opposite sides of each of the spokes and on opposite sides of the rim member so that each element engages portions of respective spokes and a portion of the rim, and then permanently fixing each of the anchor elements to the rim and the spokes as by welding. This procedure may be somewhat modified for convenience as noted below.

To assemble the spider into a composite structure the rim 3 is first provided with a plurality of elements 6a which are welded thereto, each element being in proper circumferentially spaced relation and in radial alignment with the associated spoke 2, as shown in Fig. 1. These elements 6a are preferably joined to either the upper or lower side of the rim annulus 3 with the shank portions 8 extending radially inwardly thereof. In the present instance the elements 6a are welded to the lower side of the rim 3 merely to illustrate a method of assembly. The hub and spoke assembly with the ornaments 5 attached is then placed and held in a central position within the rim annulus 3 so that the free end portion of each of the wire spoke members rests in its proper corrugation or trough 10 in the shank portion 8.

While the hub and spokes are thus held in the proper central position with respect to the rim, as by means of a suitable jig, the other elements 6b are placed on the opposite or upper side of the rim 3 from each of the elements 6a, as best illustrated in Fig. 4. The claw portion 7 of these elements 6b embrace the other half of the rim cross section opposite the element 6a and the corrugations 10 in the shank portion of the element 6b embrace the opposite sides of the wire spoke members.

While all of the elements 6a and 6b and the rim, spokes, and hub are held in the desired position they are securely spot welded or otherwise permanently mutually joined together. Each of the elements 6a and 6b is mutually secured to both the rim and wire spoke members into the completely assembled unit shown in Fig. 1. The free end portion of each spoke member 4 is enclosed and embraced by the corrugations 10 in the shank portions 8 and each spoke member is thus individually and securely joined to its associated trough in the elements 6a and 6b.

It is apparent from the description and the drawings that no supplemental operation on the spoke members 4 is necessary to secure the spokes to the anchor 6. Furthermore, the lengths of the spoke members may vary a reasonable amount and the size and shape of the rim may also vary within reasonable practical limits without affecting the efficiency of the anchor, the ease and convenience of assembling the spider, or the low cost at which the spider can be produced.

Since the anchor embraces substantially the entire cross section of the rim 3 as well as each individual spoke member 4 it will be seen that such a device is an extremely efficient means for tying the spoke members to the rim both as to strength and economy in assembly.

Figure 7:
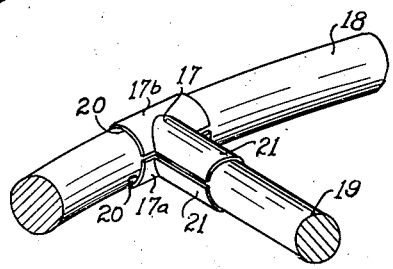
Fig. 7 is a fragmentary perspective view of a modification of an anchor for use in connection with a tubular or solid bar spoke.

A modification of this method of anchoring the spokes to the rim of a steering wheel is shown in Fig. 7. In this embodiment an anchor 17, comprising duplicate elements 17a and 17b, is mutually secured to a rim member 18 and a spoke member 19. Each element 17a or 17b includes a rim embracing or claw-shaped portion 20 and a shank portion 21 which embraces the end of the spoke member 19.

The assembling operation of this spider may be carried out in a manner similar to previously described operation.

In Fig. 1 the dotted lines around the rim indicate a coating of thermoplastic material to show how effectively and conveniently each sheet metal anchor can be entirely covered by such coating while maintaining a relatively thin smooth uninterrupted surface covering over the entire area.

The thickness of the thermoplastic coating over the major portion of the rim is preferably only slightly greater than the thickness of the material used for the anchor elements and of less thickness over the portions of the anchor elements which embrace the rim 6 (as illustrated in part in Fig. 1), so that the external finish surface of the coating is substantially the same along and around the anchor elements as it is at positions intermediate the anchor elements.

Figure 5:
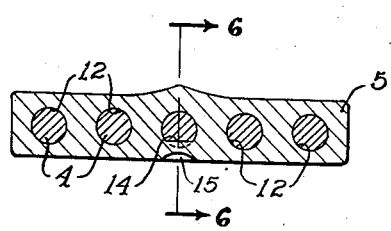
Fig. 5 is an enlarged cross sectional view through the ornamental tie bar member taken substantially along the line 5—5 of Fig. 1.
Figure 6:
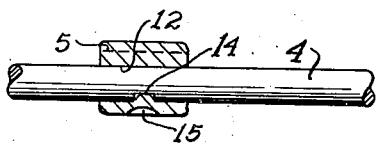
Fig. 6 is a fragmentary sectional view through the tie bar taken substantially along the line 6—6 of Fig. 5.

Referring now to Figs. 2, 5 and 6, the method and means for securing the transverse ornamental tie member 5 to each spoke 2 will be described. It has been herein stated that each of the wire spoke members 4 is securely joined at one end to the hub member 1 before the rim is mounted in place. A fragmentary view of this hub and spoke assembly is shown in Fig. 2. In this stage of the assembly the ornamental bar members 5 may be applied to the spokes.

In the present instance the tie bars 5 are shown made of metal which are substantially rectangular in shape, being sufficient in length to span or bridge each entire group of wire spoke members 4. Each tie bar is provided with a plurality of openings 12 extending transversely of its length which accommodate the wire spoke members as shown in Fig. 5.

One of these tie bar members 5 is slipped over the free end of each spoke 2 and positioned substantially mid-way between the hub and the end. In this position the tie bar is permanently secured to the spokes in a single operation.

The lower side of one or more of the spoke members 4 in each spoke 2 is provided with a notch or depression 14 best shown in Fig. 6. This notch is located at the place where the tie bar 5 is to be fixed. The tie bar is then moved along the spoke so as to conceal this notch. When the tie bar 5 is in this position the lower surface of the tie bar is punched or depressed as at 15 toward the spoke notch 14 so that the metal of the tie bar flows thereinto. Thus the tie bar 5 is securely held in the proper position on the spoke 2 by a simple and effective operation. When all of the tie bars are thus applied the rim may be attached to the ends of the spokes as already fully described.

From the above description it will be seen that a novel method for anchoring spoke members to a rim annulus and also a method of applying the ornamental tie bar to wire spoke members has been provided which is consistent with the objects set forth.

Although but two forms of the present invention have been shown and described it will be apparent to those skilled in the art that other forms may be made without departing from the spirit and scope as defined in the appended claims.

Having thus described my invention, I claim:

1. The method of making an automobile steering wheel having a plurality of wire spoke members arranged in groups, and a rim annulus, comprising positioning and holding the rim and one end of each group of wire spoke members in predetermined relative positions, holding preformed anchor elements of relatively thin sheet metal on opposite sides of the said end of each group of wire spoke members and on opposite sides of the rim member so that each element concurrently engages and conforms to the external surface of the end of each group of wire spoke members and also the adjacent portion of the rim, and permanently fusing each anchor element to the rim and to the associated group of wire spoke members and then molding a thin finish coating of thermally moldable material over the entire surface of the rim and portions of the anchor elements, the thickness of the coating over the rim being slightly greater than the thickness of the portions of the sheet metal anchor elements which overlie the rim and of less thickness over said portions of the anchor elements so as to completely cover the rim and said last mentioned portions of the anchor elements and provide a uniform external surface contour.

2. The method of making an automobile steering wheel having a plurality of groups of wire spoke members, a rim annulus and preformed anchor elements of thin sheet metal with a rim-engaging portion and a spoke-engaging portion capable of positioning the individual members of respective groups of spoke members, said method comprising placing a plurality of anchor elements on one side of the rim in circumferentially spaced relation so that the rim-engaging portion engages and conforms to the external shape of the rim annulus and the spoke-engaging portion extends radially inwardly of the rim, positioning each group of wire spoke members so that their end portions are in spoke member positioning contact with the associated spoke-engaging portion, and similarly placing another anchor element on the opposite side of the rim and group of wire spoke members from each of the first mentioned anchor elements, welding said elements to the rim and associated group of wire spoke members while the spoke members, rim and anchor elements are held in position and then covering the rim annulus and anchors completely with a thin coating of thermoplastic material.

3. An automobile steering wheel having a rim annulus, a plurality of wire spoke members arranged in groups, an anchor for securing each group of wire spoke members to the rim, said anchor comprising a pair of preformed sheet metal elements each having a rim embracing portion conforming in shape to the adjacent surface of the rim, and a shank portion having a plurality of troughs disposed substantially normal to the rim embracing portion, each trough accommodating the end portion of a wire spoke member and extending laterally from the spoke embracing portion of the anchor, at least partially around the rim, one element engaging one side of the rim and the corresponding side of a group of wire spoke members and another element engaging the opposite side of the rim and group of wire spoke members, each of said elements being integrally joined to the rim at the surface thereof which the element overlies or underlies, and a thin coating of thermally moldable material covering the entire surfaces of the rim annulus and anchors.

4. The method of making an automobile steering wheel having metallic spokes and a metallic rim annulus comprising positioning and holding the rim and one end of each spoke in predetermined relative positions, holding preformed relatively thin metallic anchor elements on opposite sides of each spoke and on opposite sides of the rim so that each anchor element concurrently engages and conforms to the external surface of the said one end of the associated spoke and a portion of the rim, permanently fusing each anchor element to underlying aforesaid parts of the wheel, and then molding a thin coating of thermally moldable material around the entire surface of the rim and over and around the portions of the anchor elements which overlie the rim, the thickness of the coating over the rim being slightly greater than the thickness of the material of said portions of the anchor elements so as to completely cover said portions of all of the anchor elements and of such thickness over said portions of the anchor elements as will maintain a uniform external surface contour entirely around the rim portion of the wheel.

HARRY A. HUSTED.